United States Patent
Treyer et al.

(10) Patent No.: US 8,600,230 B2
(45) Date of Patent: Dec. 3, 2013

(54) METHOD AND DEVICE FOR DATA PROCESSING

(75) Inventors: Thomas Treyer, München (DE); Harald Rohde, München (DE); Sylvia Smolorz, München (DE)

(73) Assignee: Nokia Siemens Networks Oy, Espoo (FI)

( * ) Notice: Subject to any disclaimer, the term of this patent is extended or adjusted under 35 U.S.C. 154(b) by 33 days.

(21) Appl. No.: 13/266,015

(22) PCT Filed: Apr. 23, 2009

(86) PCT No.: PCT/EP2009/054868
§ 371 (c)(1),
(2), (4) Date: Dec. 2, 2011

(87) PCT Pub. No.: WO2010/121658
PCT Pub. Date: Oct. 28, 2010

(65) Prior Publication Data
US 2012/0087660 A1    Apr. 12, 2012

(51) Int. Cl.
*H04B 10/00*    (2013.01)

(52) U.S. Cl.
USPC .................................. 398/25; 398/45; 398/58

(58) Field of Classification Search
USPC ................................ 398/25, 185, 202, 45, 58
See application file for complete search history.

(56) References Cited

U.S. PATENT DOCUMENTS

| | | | |
|---|---|---|---|
| 4,589,111 A | * | 5/1986 | Adachi .......................... 714/748 |
| 7,636,358 B1 | * | 12/2009 | Manchester et al. .......... 370/394 |
| 2007/0286609 A1 | | 12/2007 | Ikram et al. |
| 2009/0190931 A1 | * | 7/2009 | Hamano et al. ................. 398/99 |

FOREIGN PATENT DOCUMENTS

EP    1978656 A1    10/2008
WO    2008/068811    * 12/2008

* cited by examiner

*Primary Examiner* — Leslie Pascal
(74) *Attorney, Agent, or Firm* — Laurence A. Greenberg; Werner H. Stemer; Ralph E. Locher

(57) ABSTRACT

A method and a device for data processing in an optical network element are suggested, wherein the optical network element changes between a low-speed mode and a high-speed mode of data transmission. In this manner, the optical network element has efficient power savings because it can effectively operate in the low-speed mode which requires less power consumption.

16 Claims, 2 Drawing Sheets

METHOD AND DEVICE FOR DATA PROCESSING

BACKGROUND OF THE INVENTION

Field of the Invention

The invention relates to a method and to a device for data processing.

Optical access networks can be used for conveying data at a high bandwidth. The demand for a peak bandwidth of a broad-band access subscriber line is increasing. Optical access lines are currently approaching a peak bandwidth of 1 Gbit/s per subscriber in upstream as well as in downstream direction. The electronic signal processing of such data streams requires a high amount of electrical power, wherein the access lines are in an "always on" state thereby dissipating electrical energy even if there is no traffic at all or no significant amount of traffic. Hence, the trends towards high bandwidth and "always on" result in a waste of energy, which is problematic in particular from an economical and an ecological point of view.

It is known to switch off the customer premises equipment (CPE) manually by user intervention. As this solution might be feasible for one personal computer per CPE, it is difficult to manage for several independent users and/or services accessing a network via a single CPE. In addition, an increasing number of clients or applications (e.g. IPTV, VoIP phones) require the CPE to be in the "always on" state.

It is also a problem that access technologies like GPON require the CPE frontend to run at 2.5 Gbit/s without interruptions even if the subscriber has a traffic load of only 64 kBit/s or less. Further GPON standards (e.g., NG-PON) may worsen the situation as the CPE has to be active at 10 Gbit/s.

BRIEF SUMMARY OF THE INVENTION

The problem to be solved is to overcome the disadvantages stated above and in particular to enable an efficient concept of power saving.

This problem is solved according to the features of the independent claims. Further embodiments result from the depending claims.

In order to overcome this problem, a method for data processing in an optical network element is suggested,
  wherein the optical network element changes between a low-speed mode and a high-speed mode of data transmission.

It is noted that changing or switching between the modes of data transmission can be from the high-speed mode to the low-speed mode or vice versa. The modes of data transmission may also comprise an according data reception, i.e. a reception pursuant to the actual transmission mode selected.

It is further noted that there may be several modes, in particular more than two modes of data transmission, each of such modes, e.g., providing a different data rate. As the data rate correlates with the processing speed at the network component, the less data rate the less power consumption and therefore the less power dissipation in case no traffic is to be transmitted (and received).

Hence, this concept allows for an efficient utilization of the "always-on" condition, wherein the low-speed mode with a reduced processing speed (compared to the high-speed or "normal" mode of operation) consumes less power than said high-speed mode.

Advantageously, even the low-speed mode may still suffice the always-on condition of clients or applications, e.g., VoIP calls, IPTV for a single TV channel.

In an embodiment, the low-speed mode is chosen in case the data traffic reaches or falls below a predetermined value.

Hence, the low-speed mode may in particular automatically be selected, e.g., by threshold comparison.

In another embodiment, the optical network element is or is associated with an optical network unit or with an optical line termination.

In a further embodiment, the optical network element changes between a low-speed mode and a high-speed mode of data transmission in an upstream direction and/or in a downstream direction.

Hence, the modes of transmission can be adjusted independently for the upstream and downstream directions.

In a next embodiment, the network element analyzes its transmit queue and selects the mode of data transmission dependent on at least one of the following criteria:
  A queue fill grade;
  an expected delivery delay for high priority packages;
  a current, a future or a past traffic situation.

In particular, the traffic situation known from the past (e.g., due to a traffic distribution to be expected during a day and/or during a week) can be used to anticipate the mode of data transmission to be used.

It is also an embodiment that before changing the mode of data transmission, the network element waits for a current data packet delivery to be at least partially finished.

This advantageously avoids any packet loss as imperfect packets would have been rejected.

Pursuant to another embodiment, the optical network element changes the mode of data transmission by
  stopping the current data transmission;
  signaling the change of mode of data transmission to a receiver;
  changing the mode of data transmission and forwarding data to the receiver after a predetermined timer is lapsed and/or after the receiver acknowledged a change of mode of data transmission Said receiver may be a receiver of a counterpart network element. The receiver is in particular a coherent receiver.

According to an embodiment, the optical network element processes data in said low-speed mode by means of undersampling, in particular by undersampling an intermediate frequency provided by a heterodyne optical unit.

This approach of undersampling is feasible as the phase as well as amplitude information still can be obtained by undersampling the intermediate frequency.

According to another embodiment, a local oscillator or the optical network element is adjusted by
  detecting a frequency drift in the low-speed mode;
  switching to the high-speed mode; and
  correcting the frequency drift.

As an option, after the frequency drift has been compensated in the high-speed mode, the optical network element may switch back to the low-speed mode.

In yet another embodiment, the optical network element changes from low-speed mode to high-speed mode substantially immediately.

Hence, substantially immediately refers in particular to switching without having to wait for the data packets to be completely processed.

According to a next embodiment, an interrupted data packet is retransmitted at high-speed mode of transmission.

Pursuant to yet an embodiment, the optical network element changes from low-speed mode to high-speed mode when user data are to be conveyed.

Hence, every time user data is to be conveyed, the optical network element may switch to the high-speed mode of data transmission. The low-speed mode in this scenario is utilized for power saving purposes in case no user data is to be transferred (transmitted and/or received). The change between transmission modes may be implemented with a hysteresis to avoid ineffective oscillation between the two modes of transmission.

According to a further embodiment, in the low-speed mode, a modulation scheme is modified, in particular a bandwidth for a modulated signal is reduced in said low-speed mode.

The problem stated above is also solved by a device comprising a and/or being associated with a processor unit and/or a hard-wired circuit and/or a logic device that is arranged such that the method as described herein is executable thereon.

According to an embodiment, the device is a communication device, in particular a or being associated with an optical network element.

The problem stated supra is further solved by a communication system comprising the device as described herein.

Embodiments of the invention are shown and illustrated in the following figures:

DESCRIPTION OF THE INVENTION

The approach provided in particular utilizes NGOA (Next Generation Optical Access) systems, where the CPE is an ONU (Optical Network Unit), which is based upon an optical heterodyne receiver.

In such a system the power consumption is basically determined by signal processing required to demodulate the received signal. The power required by the electronic components thus increases with the processing speed.

Based on today's components, an exemplary power consumption for a 1 Gbit/s ONU can be estimated as follows:
  Transmit laser: 100 mW;
  A/D converter (required for a SW-radio in receive operation): 2500 mW;
  ASIC for SW-radio (receiving side): 5000 mW;
  ASIC for signal framing (transmitting side): 1000 mW.

Figure 1:
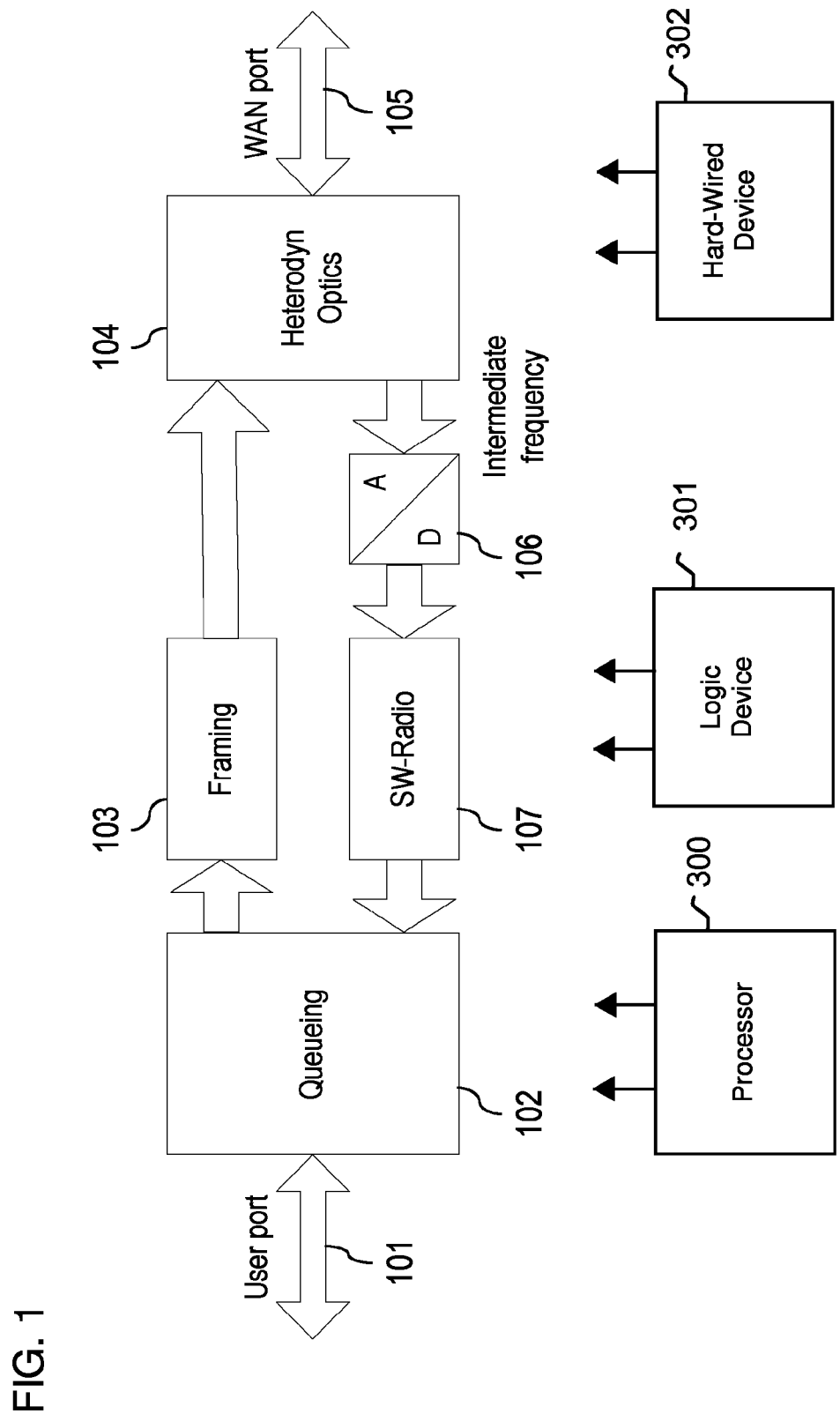
FIG. 1 shows a block diagram comprising components of an ONU.

FIG. 1 shows a block diagram comprising components of an ONU. A user port 101 is connected to a queuing unit 102 conveying data to a framing unit 103 and further to a heterodyne optics unit 104, which is connected to a WAN port 105. Also, an intermediate frequency determined at the heterodyne optics unit 104 is fed to an A/D converter 106 and further via a SW radio 107 to said queuing unit 102.

This approach in particular suggests two modes of operation for the access link. The first mode is a high-speed mode (also referred to as "high-speed mode" or "high power mode") with a full bandwidth being utilized. The second mode is a low-speed mode (also referred to as "low power mode") with the connection still being active, but the bandwidth being reduced. The actual reduction of the bandwidth can be tailored to a current bandwidth demand.

For example, the full bandwidth may amount to 1 Gbit/s and the reduced bandwidth may amount to 10 Mbit/s. The second mode may hence still provide sufficient bandwidth for typical "back-ground" traffic, e.g., VoIP calls, IPTV of a single TV channel.

Also the second mode of low-speed allows to reduce the clock frequency of the signal processing logic by a factor of 100, thereby reducing the power dissipation of the electronic processing modules by a factor of 10 at least.

The first mode can be used, e.g., to enable fast downloads of software packages or to upload photographs to a printing service, but this first mode may not have to be active all the time or most of the time. Hence, an overall energy dissipation can be significantly reduced by utilizing the second mode.

Because connectivity between the ONU and the OLT is provided in both modes, the ONU and the OLT may each switch between both modes synchronously. Bandwidth may be changed in upstream or in downstream direction independently from one another.

Activation/Deactivation of Low-Power Mode

The mechanism can be the same for upstream- and for downstream directions. The transmitter may analyze its transmit queues. At least two criteria may apply:
(1) A queue fill grade; and
(2) an expected delivery delay for high priority packages.

At least one of the criteria can be used to define whether high-speed mode or low-speed mode is suited best for the current load situation.

Before changing the mode (high-speed to low-speed or vice versa), the transmitter may wait until a current packet delivery is (at least partially) finished. This avoids packet loss. Then, forwarding can be stopped and a change of mode can be signaled to the receiver at the other end of the optical network.

Next, the transmitter may switch to the new modulation mode. As soon as the receiver acknowledges a successful switch to the new mode, the transmitter forwards data utilizing this new mode (i.e., high or low-speed mode)

As an alternative, the transmitter does not have to wait for an acknowledgement. Instead, the transmitter may wait for a specified time interval, which can be set according to a worst case settling time of the receiver.

Modulation Schemes for Full Speed and Low-Power Mode

In both modes, high-speed and low-speed, data signals can be modulated onto an optical wavelength using (differential) n-ary phase shift keying, especially DQPSK (Differential Quad Phase Shift Keying).

To demodulate the signal, the signal can be sampled with an analog to digital (A/D) converter and the transmitted data signal is reconstructed in the electronic domain by signal processing. The sampling rate of the A/D converter is significantly higher than the intermediate frequency (at least a factor of two, according to the Nyquist-Shannon sampling theorem, and in practice rather of a factor of four). In a typical SW radio implementation the sampling rate of the A/D converter may amount to 3-4 GSamples per second to decode a payload of 1 Gbit/s.

In a system that uses heterodyne detection with a coherent receiver, the modulated data signal occurs at an intermediate frequency which is given by a difference frequency of the incoming data wavelength and the local oscillator frequency. In case of a UDWDM NGOA system, the intermediate frequency may amount to ca. 1 GHz. Typically, the intermediate frequency is lower than the sampling rate and the intermediate frequency signal is oversampled.

The approach provided here does not have to change the intermediate frequency in the low-speed mode. It reduces the modulation rate and switches from an oversampling of the intermediate frequency to an undersampling, i.e. to sample, e.g., only every 4th or every 10th cycle of the intermediate frequency.

Nevertheless, any change of the phase of the signal can be detected in the SW radio block as long as the changes are slower than the sampling rate. Therefore the modulation rate is slower than the sampling rate of the A/D converter. In this low-speed mode the modulation scheme can be the same as in the full speed mode.

As an option, amplitude modulation can be used as the undersampling allows for reproduction of the signal's amplitude as well.

Figure 2:
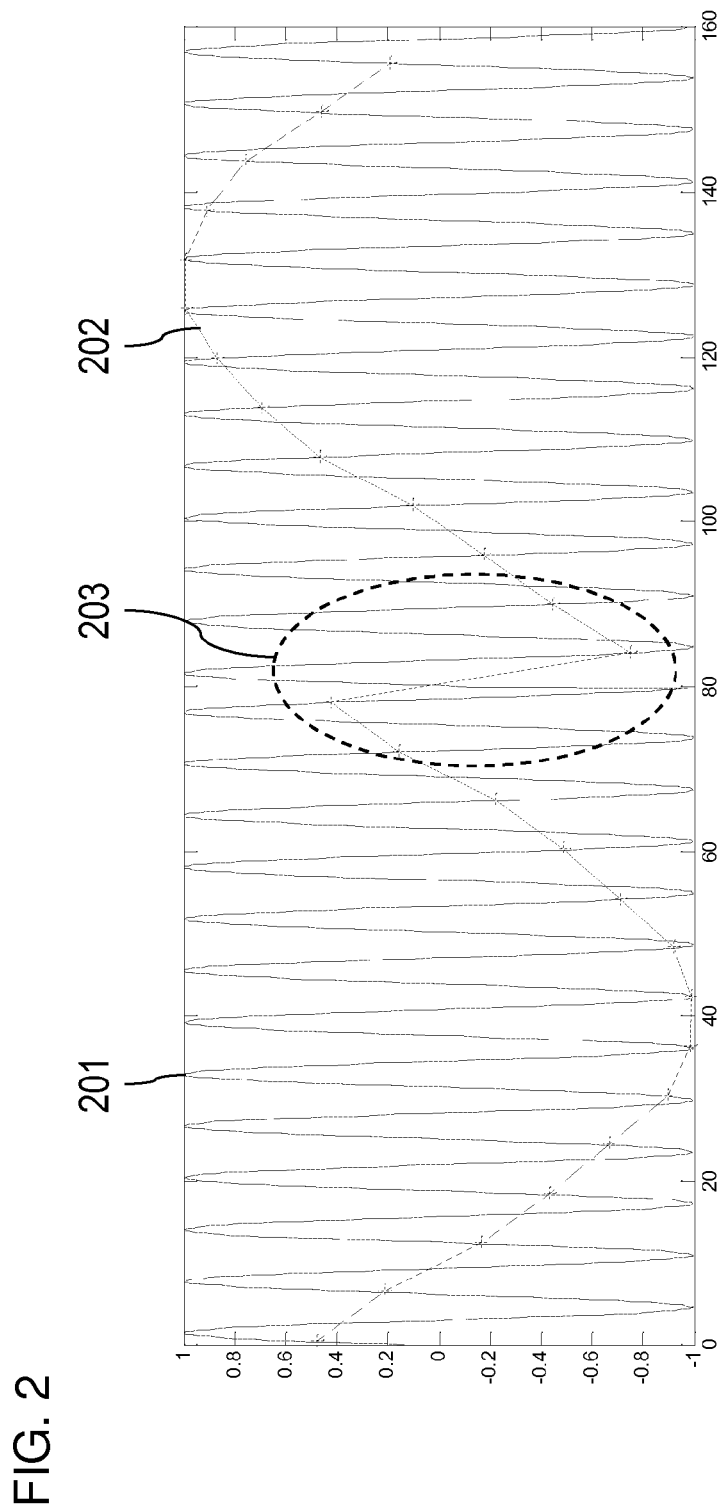
FIG. 2 depicts a sampling scheme comprising a fast oscillating curve and an undersampled graph.

FIG. 2 depicts a sampling scheme comprising a graph 201 and an undersampled graph 202. The graph 201 is a fast oscillating curve that is sampled at a given sampling frequency resulting in said graph 202. Said graph 202 is a virtual reproduction of the original curve.

A phase jump 203 can be detected in the undersampled graph 202. Thus, phase modulated data can be transmitted utilizing said undersampling technique.

The ambiguity which may usually occur with regard to undersampling, i.e. various oscillation frequencies could match the sparse sampling points, does not pose a problem in this case, because the intermediate frequency is determined initially in full bandwidth mode, using oversampling, and only slow changes may be tracked via said undersampling mode.

Tuning of Local Oscillator

The heterodyne receiver utilizes a local oscillator. In case of an optical heterodyne receiver, this local oscillator may be associated with or comprise a laser. This laser is tuned by an algorithm that detects the intermediate frequency and controls the local oscillator in a way that the intermediate frequency does not deviate from the nominal value.

In low-speed mode, such control mechanism may not work properly, because the intermediate frequency may not be determined exactly due to the undersampling. However, frequency drifts can be detected and if fast frequency drifts occur, the ONU can switch back to full speed mode, detect the frequency drift, correct it and switch back to low-speed mode.

Switch-Over Time

The switch-over time from full-speed mode to low-power mode may not be critical, because such switching preferably occurs if the queue of the transmitter is empty.

However, switching from low-speed mode to full-speed mode is more critical, because a long switch-over time may introduce delay-jitter for the packets to be transmitted.

The switch-over time is determined by the modulation scheme and of the SW-radio's performance to become aware of the signal. Here, a switch-over time significantly below 1 ms may be expected. For example, the frequency-hopping algorithm of GSM can handle 217 hops per second, and the loop bandwidth of GSM is much lower than the loop bandwidth of an optical heterodyne receiver, which operates in the Gbit/s range. Thus, following switch-over times may be achieved in case the full-speed mode operates at 1 Gbit/s and the low-speed mode operates at 10 Mbit/s:

Switch-over from low-speed mode to full-speed mode: 0.1 ms

Switch-over from full-speed mode to low-speed mode: 1 ms

Delay due to packet building (packetizing delay) in low-speed mode: 1.1 ms

Hence, the maximum delay jitter for a packet amounts to the sum of the switch-over delay and the packetization delay as the switch-over may not happen before the current packet is completely forwarded.

The resulting value for the delay jitter amounting to 2 ms can be compared with other delay values in the access. For example forward error correction (FEC) utilized in the DSL environment introduces about 20 ms delay, and time-slot based mechanisms like GPON add up to 100 ms delay jitter.

Nevertheless, effective packetization delay can be reduced further by introducing a pre-emptive scheme for switch-over. Thus, the switch-over from low-speed mode to full-speed mode may happen immediately, even if the current packet is not processed completely. After the switch-over has occurred, the interrupted packet can be re-transmitted, now at the higher speed.

Another possibility comprises switching to full-speed whenever a packet has to be transmitted. In such configuration the low-speed mode is active only if no packet has to be transmitted. Here, the delay jitter introduced by the power saving operation can be reduced to 0.1 ms or less.

Tune-in of Heterodyne Receiver

The modulation scheme can be reduced in low-speed mode. This affects the signal in the optical domain. The optical signal has a spectral width, which corresponds to the symbol rate.

For example, the spectral width may be 500 MHz in the full-speed mode for DQPSK modulated signals and 5 MHz in the low-speed mode. During regular operation there should be no critical effect. However, an operation mode may be critical when the receiver searches for the optical wavelength to be received as a wider signal may be easier to find. Therefore, it might be necessary to go to full-speed mode whenever the receiver searches for the optical wavelength.

System Behavior

The approach presented in particular refers to a power-saving mode, which is almost completely transparent to the user. The only effect to the user may be an additional delay jitter, which is marginal and can be disregarded for most applications.

As the switch-over time is fast, this power-saving algorithm may operate on single bursts of packets. As a consequence, the power saving is in effect most of the time, no interaction with the user is required. The average power dissipation of an ONU working according to this concept is significantly lower than that of any GPON modem.

Finally, FIG. 1 shows a processor unit 300 and/or a hard-wired circuit 302 and/or a logic device 301 that is arranged such that the method as described herein is executable thereon.

List of Abbreviations:
A/D Analog to Digital
CPE Customer Premises Equipment
DQPSK Differential Quad PSK
DSL Digital Subscriber Line
FEC Forward Error Correction
GPON Gigabit PON
GSM Global System for Mobile Communications
IP Internet Protocol
IPTV IP Television
NG Next Generation
NGOA Next Generation Optical Access
OLT Optical Line Termination
ONU Optical Network Unit
PON Passive Optical Network
PSK Phase Shift Keying
SW Software
UDWDM Ultra Dense WDM
WAN Wide Area Network
WDM Wavelength Division Multiplex

The invention claimed is:

1. A method for data processing in an optical network element, wherein the optical network element switches between a low-speed mode and a high-speed mode of data transmission, which comprises the steps of:
    analyzing at least one of the following criteria:
        a queue fill grade;
        an expected delivery delay for high priority packages; and
        a currently traffic situation, a future traffic situation or a past traffic situation;
    selecting automatically a selected mode of data transmission being either the low-speed mode or the high-speed mode of data transmission;
    switching to the selected mode of data transmission;
    performing the following steps when operating in the low-speed mode of data transmission:
        reducing a processing speed of a signal processing logic and a modulation rate;
        providing received data with an intermediate frequency via a heterodyne optical receiver unit; and
        undersampling the received data by undersampling the intermediate frequency which reduces the processing speed of the signal processing logic.

2. The method according to claim 1, which further comprises operating in the low-speed mode when data traffic reaches or falls below a predetermined value.

3. The method according to claim 1, wherein the optical network element is or is associated with an optical network unit or with an optical line termination.

4. The method according to claim 1, wherein the optical network element switches between the low-speed mode and the high-speed mode of data transmission at least one of in an upstream direction or in a downstream direction.

5. The method according to claim 1, wherein before changing a mode of the data transmission, the optical network element waits for a current data packet delivery to be at least partially finished.

6. The method according to claim 1, wherein the optical network element switches the mode of data transmission by the further steps of:
    stopping a current data transmission;
    signaling a switching of the mode of data transmission to a receiver;
    switching the mode of data transmission and forwarding data to the receiver after a predetermined time has lapsed and/or after the receiver acknowledged a change of the mode of data transmission.

7. The method according to claim 1, wherein a local oscillator or the optical network element is adjusted by the further steps of:
    detecting a frequency drift in the low-speed mode;
    switching to the high-speed mode; and
    correcting the frequency drift.

8. The method according to claim 1, wherein the optical network element changes from the low-speed mode to the high-speed mode substantially immediately.

9. The method according to claim 8, which further comprises retransmitting an interrupted data packet at the high-speed mode of transmission.

10. The method according to claim 1, wherein the optical network element changes from the low-speed mode to the high-speed mode when user data are to be conveyed.

11. The method according to claim 1, wherein in the low-speed mode, a modulation scheme is modified.

12. The method according to claim 1, wherein in the low-speed mode, a bandwidth for a modulated signal is reduced in the low-speed mode.

13. A device, comprising:
    at least one apparatus selected from the group consisting of a processor unit, a hard-wired circuit and a logic device; and
    said apparatus programmed to perform a method for data processing in an optical network element, wherein the optical network element switches between a low-speed mode and a high-speed mode of data transmission, said apparatus programmed to:
    analyze at least one of the following criteria:
        a queue fill grade;
        an expected delivery delay for high priority packages; and
        a currently traffic situation, a future traffic situation or a past traffic situation;
    select automatically a selected mode of data transmission being either the low-speed mode or the high-speed mode of data transmission;
    switch to the selected mode of data transmission;
    perform the following steps when operating in the low-speed mode of data transmission:
        reduce a processing speed of a signal processing logic and a modulation rate;
        provide received data with an intermediate frequency via a heterodyne optical receiver unit; and
        undersample the received data by undersampling the intermediate frequency which reduces the processing speed of the signal processing logic.

14. The device according to claim 13, wherein the device is a communication device.

15. The device according to claim 13, wherein the device is an optical network element.

16. A device, comprising:
    a processor unit programmed to perform a method for data processing in an optical network element, wherein the optical network element switching between a low-speed mode and a high-speed mode of data transmission, said processor unit programmed to:
    analyze at least one of the following criteria:
        a queue fill grade;
        an expected delivery delay for high priority packages; and
        a currently traffic situation, a future traffic situation or a past traffic situation;
    select automatically a selected mode of data transmission being either the low-speed mode or the high-speed mode of data transmission;
    switch to the selected mode of data transmission;
    perform the following steps when operating in the low-speed mode of data transmission:
        reduce a processing speed of a signal processing logic and a modulation rate;
        provide received data with an intermediate frequency via a heterodyne optical receiver unit; and
        undersample the received data by undersampling the intermediate frequency which reduces the processing speed of the signal processing logic.

* * * * *